United States Patent [19]
Dorenbos

[11] Patent Number: 5,751,813
[45] Date of Patent: May 12, 1998

[54] USE OF AN ENCRYPTION SERVER FOR ENCRYPTING MESSAGES

[75] Inventor: David Dorenbos, Elmhurst, Ill.

[73] Assignee: Motorola, Inc., Schaumburg, Ill.

[21] Appl. No.: 639,457

[22] Filed: Apr. 29, 1996

[51] Int. Cl.$^6$ .................................................. H04L 9/00
[52] U.S. Cl. .................................... 380/49; 380/25
[58] Field of Search ................................ 380/49, 25

[56] References Cited

U.S. PATENT DOCUMENTS

| | | | |
|---|---|---|---|
| 5,455,865 | 10/1995 | Perlman | 380/49 |
| 5,479,514 | 12/1995 | Klonowski | 380/47 |
| 5,574,785 | 11/1996 | Ueno | 380/2 |

*Primary Examiner*—Thomas H. Tarcza
*Assistant Examiner*—Carmen D. White
*Attorney, Agent, or Firm*—Susan L. Lukasik

[57] ABSTRACT

An encryption server receives a first encrypted message (105) and decrypts (403) the encrypted message using a first key, yielding a decrypted message comprising a second encrypted message (105A), an identification of a sender of the first encrypted message, and an identification of a first recipient. The second encrypted message, the identification of the sender, and the identification of the first recipient are determined (405) from the decrypted message. The second encrypted message and the identification of the sender are encrypted (409) with a second key, yielding a third encrypted message (109). The third encrypted message (109) is transmitted to the first recipient.

34 Claims, 4 Drawing Sheets

USE OF AN ENCRYPTION SERVER FOR ENCRYPTING MESSAGES

FIELD OF THE INVENTION

This invention relates to communication systems, including but not limited to encrypted communication systems.

BACKGROUND OF THE INVENTION

Encrypted voice and data communication systems are well known. Many of these systems provide secure communications between two or more users by sharing one or more pieces of information between the users, which permits only those users knowing that information to properly decrypt the message. This information is known as the encryption key, or key for short. Encryption keys may be private keys, where a single key is utilized for encryption and decryption, or public keys, where multiple keys are utilized for encryption and decryption.

Methods of encrypting using public-key encryption are well known in the art. Typically, a public-key encryption is a method of encryption by which a single message is encrypted using a sender's private key and then a recipient's public key. The recipient then decrypts the message using the recipient's private key and then the sender's public key. Typically, public keys are 512 bits long, although some public keys have as few as 256 bits. Some encryption experts recommend using 1024-bit keys. Because the computational power required to break a key increases exponentially with the length of the key, longer keys provide more security. In addition, because two keys are needed to decrypt a message, two longer keys are more difficult to decrypt if neither key is known.

Today, secure communication systems are used to transmit data in an encrypted fashion. If a user wishes to send the same message to five different recipients, the user must encrypt the message five different times, each time using the public key of a different recipient for the message. The user then transmits the five messages to the five recipients. Such a process, however, is troublesome when the user wishes to transmit to, for example, 100 or more recipients. In this instance, the user must encrypt each message individually 100 or more times, one for each recipient. If the user has a portable communication device, such as a laptop computer, the user's battery may run out of power before encryption and transmission of each message has occurred. In addition, the encryption and transmission process can consume a lot of time and processing power for the portable device, rendering the portable device unavailable for other activities by the user during the encryption and transmission time period. Thus, such transmissions would be impractical for portable users.

Accordingly, there is a need for a method of transmitting encrypted data messages to multiple users without resulting in a time or power barrier to the user's communication device.

DESCRIPTION OF A PREFERRED EMBODIMENT

Figure 1:
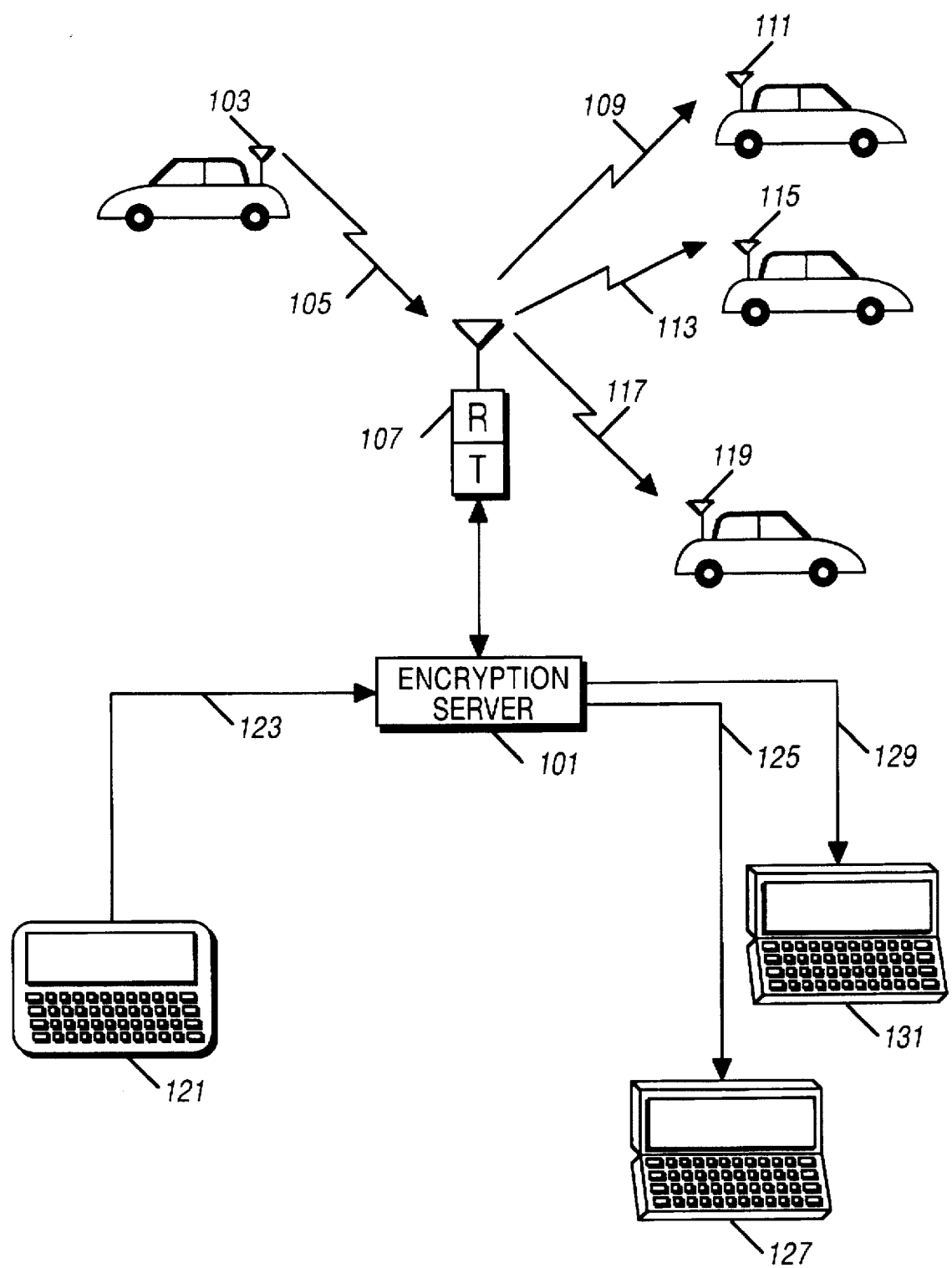
FIG. 1 is a block diagram of a communication system having an encryption server in accordance with the invention.

The following describes an apparatus for and method of using an encryption server for encrypting messages. Messages are encrypted twice, once with the sender's private key and then with an encryption server's public key before transmission of the messages to the encryption server. The encryption server decrypts received messages with the encryption server's private key, yielding an encrypted message, a user identification (ID), and one or more recipient IDs. The encryption server encrypts the encrypted message and the user ID individually with each of the recipient's public keys and transmits the resultant message(s) to the appropriate recipient. Each recipient decrypts the messages using the recipient's private key and the sender's public key. A secure communication system is thereby provided, wherein portable communication devices are neither tied up nor drained of power because the device's user wishes to send a single encrypted message to multiple recipients.

A method of using an encryption server for encrypting messages comprises the steps of, at a communication unit operated by a user generating a digital data message. The digital data message is encrypted using a first key, yielding a first encrypted message. An identification of the user and an identification of a first recipient are appended to the first encrypted message, yielding an appended first encrypted message. The appended first encrypted message is encrypted using a second key, yielding a second encrypted message. The second encrypted message is transmitted to an encryption server. At the encryption server, the second encrypted message is received. The second encrypted message is decrypted using a third key, yielding the appended first encrypted message. The first encrypted message, the identification of the user, and the identification of the first recipient are determined from the appended first encrypted message. The first encrypted message and the identification of the user are encrypted with a fourth key, yielding a third encrypted message. The third encrypted message is transmitted to the first recipient. In the preferred embodiment, the first key is a private key associated with the user, the second key is a public key associated with the encryption server, the third key is a private key associated with the encryption server, and the fourth key is a public key associated with the first recipient. Alternatively, the second key and the third key may be identical. The transmitting steps may be performed over wireless communication resources, such as radio frequency communication resources, or wireline communication resources, such as standard telephone lines or fiber optic cable.

In addition, the step of appending may further comprise the step of appending an identification of a second recipient to the first encrypted message, thereby yielding the appended first encrypted message. In this case, the method further comprises the steps of encrypting, by the encryption server, the first encrypted message and the identification of the user with a fifth key, yielding a fourth encrypted message, and transmitting the fourth encrypted message to the second recipient. In the preferred embodiment, the fifth key is a public key associated with the second recipient. Alternatively, the step of appending may comprise the step of appending three or more identifications of recipients to the first encrypted message, thereby yielding the appended first encrypted message.

Figure 2:
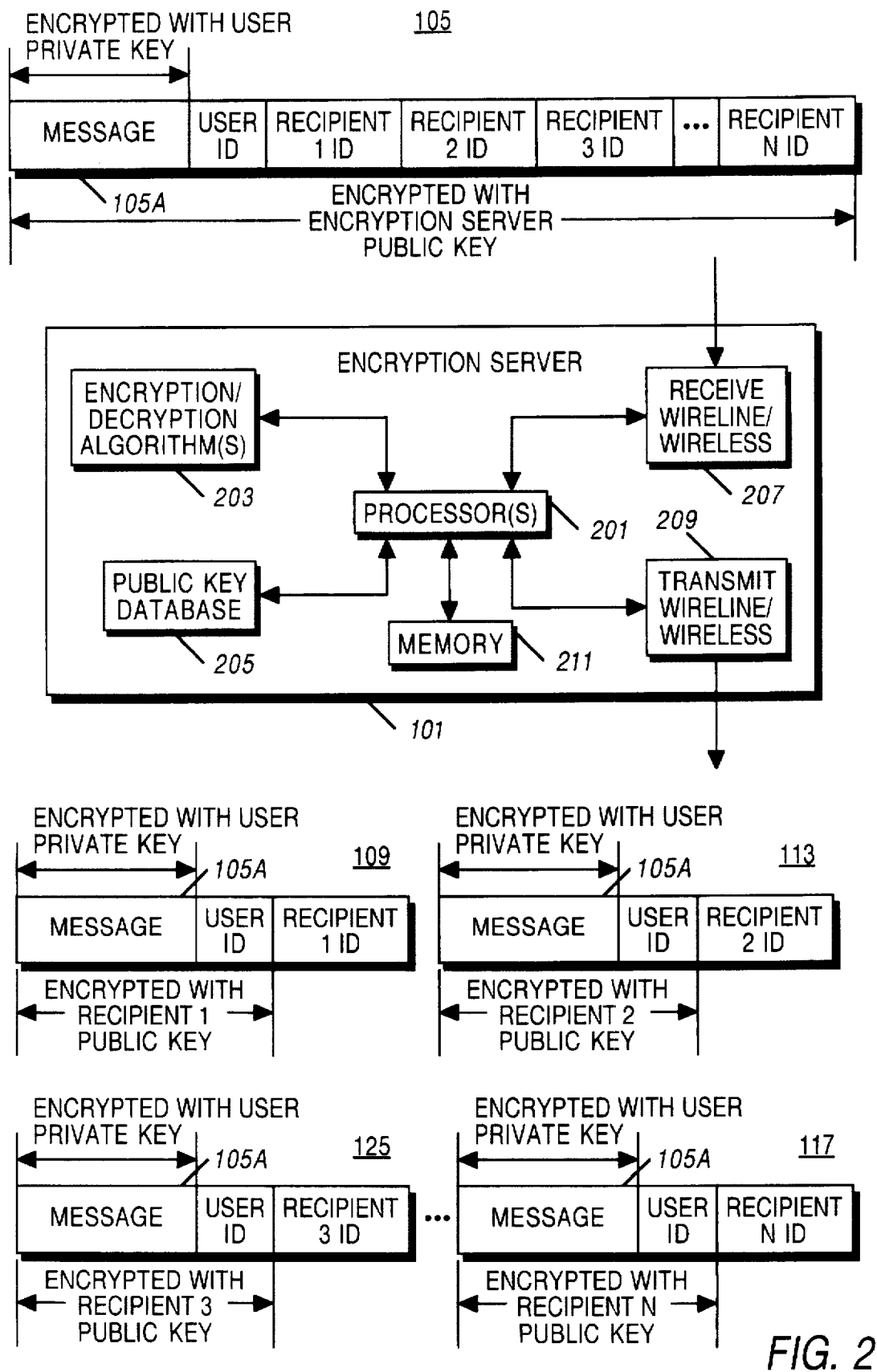
FIG. 2 is a block diagram of an encryption server in accordance with the invention.

A block diagram of a communication system having an encryption server is shown in FIG. 1. An encryption server 101 is shown at the center of FIG. 1. Further details of the encryption server 101 are shown in FIG. 2 described below. A user of a first communication unit 103 utilizes the first communication unit 103 to generate an digital data message that is encrypted in two stages in the preferred embodiment. In the first stage, the digital data message is encrypted using a first key, which is the user's private key in the preferred embodiment. The result of this encryption is a first-stage encrypted message. (In an alternate embodiment, the digital data message is not encrypted using the first key.) The user's identification (ID) and one or more recipient IDs are appended to the first-stage encrypted message, yielding an appended message. The appended message is encrypted using a second key, yielding a second-stage encrypted message 105. In the preferred embodiment, the second key is the public key associated with the encryption server 101. The communication unit transmits the second-stage encrypted message 105 to the encryption server via a wireless communication link to a wireless communication device 107, such as a radio frequency (RF) base station, repeater, or radio, or infrared communication device. The second-stage encrypted message 105 is conveyed by the wireless communication device 107 to the encryption server 101.

The encryption server 101 decrypts the second-stage encrypted message 105 using an appropriate key. In the preferred embodiment, the appropriate key is the encryption server's private key. The encryption server 101 then determines the user's ID from the decrypted message and also determines the IDs of all recipients that the user indicated as intended targets of the first-stage encrypted message. The encryption server 101 then encrypts the user's ID along with the first-stage encrypted message by encrypting with the public key of the first recipient. The resultant message 109 is transmitted to the first recipient, who utilizes communication unit 111. The encryption server then encrypts the first-stage encrypted message along with the user's ID by encrypting with the public key of the second recipient and transmitting the resultant encrypted message 113 to the second recipient, who utilizes communication unit 115. This process continues until the encryption server reaches the last recipient ID on the user's list, and encrypts the first-stage encrypted message along with the user's ID by encrypting with the public key of the last recipient and transmitting the resultant encrypted message 117 to the last recipient, who utilizes communication unit 119.

The encryption server 101 may also receive user requests for encryption from wireline communication devices 121 via wireline communication channels. As with the wireless transmission, the encryption server decrypts the received message 123 using the private key of the encryption server, then encrypts the resultant message individually for each different recipient using the appropriate recipient's individual public key. These recipients may be wireline devices 127 and 131, which receive the messages 125 and 129 via wireline communication channels.

The above examples describe RF to RF transmission and wireline to wireline transmission of encrypted messages. Nevertheless, the method of the present invention is equally successful if a wireline device 121 requests transmission to wireless communication units 111, 115, and 119. Similarly, a wireless communication unit 103 may request transmission from the encryption server 101 to wireline communication devices 127 and 131. In addition, the recipients may be a combination of both wireless and wireline communication units 111, 115, 119, 127, and 131, regardless of whether the sender uses a wireless communication unit 103 or a wireline communication device 121.

Upon receipt of the encrypted message from the encryption server, each recipient decrypts the message with the recipient's own private key, and after determining the user's ID, decrypts the resultant message with the user's public key, thereby yielding the original digital data message. The user is also referred to as the sender of the (second-stage) encrypted message 105.

A block diagram of an encryption server 101, including its input signals 105 and output signals 109, 113, 125, and 117, is shown in FIG. 2. In the preferred embodiment, the encryption server 101 is a Sun SparcServer2000 in a multiprocessor configuration, available from Sun Microsystems. The encryption server 101 comprises one or more processors 201, such as microprocessors or digital signal processors, as are well known in the art. The processors 201 have access to encryption and decryption algorithm(s) 203, a public key data base 205, and memory 211. The encryption/decryption algorithms 203 include public key algorithms, private algorithms, and other algorithms as may be used in the art. The public key data base 205 includes a list of IDs, as used by senders (users) and recipients, and the public keys associated with each of these IDs. The memory 211 includes programming and other data as is necessary to provide functionality as described herein for the encryption server 101. A receive block for wireline and wireless communications 207 and a transmit block for wireline and wireless communications 209 are also connected to the processors 201. The receive block for wireline and wireless communications 207 performs appropriate demodulation techniques on received messages 105 and 123. The transmit block for wireline and wireless communications 209 performs appropriate modulation techniques on messages 109, 113, 124, and 117 to be transmitted. In addition, the encryption server 101 may be equipped with hardware and/or software to provide the encryption server 101 with over-the-air-rekeying capabilities.

As shown in FIG. 2, a user message 105 comprises a second-stage encrypted (encrypted using the encryption server's public key) message comprising the digital data message 105A, first-stage encrypted with the user's (sender's) private key, in addition to the user ID and a number of recipient IDs. Alternatively, the user message 105 may comprise an unencrypted digital data message 105A, the user ID, and one or more recipient IDs. The user message 105 is input to the receive wireline/wireless block 207, the output of which is input to the processor(s) 201. The processor(s) 201 utilize(s) the encryption/decryption algorithm(s) 203 and the public key data base 205 to decrypt the message 105 using the private key of the encryption server. The processor(s) 201 then determine(s) the first-stage encrypted message 105A, the user ID, and the first recipient ID from the decrypted message. The processor(s) 201 then determine(s) the first recipient's public key from public key data base 205, and the encrypt the first-stage encrypted message 105A and the user ID by using the encryption/decryption algorithms 203 and the first recipient's public key. The processor(s) 201 then append(s) the first recipient ID, thereby yielding a message 109 that is sent to the transmit wireline/wireless block 209 for transmitting to the first recipient's communication unit 111, as shown in FIG. 1. A similar process is performed on the first-stage encrypted message (or unencrypted digital data message) 105A and the user ID for each of the recipients listed in the user's message 105.

In an alternate embodiment, the encryption server 101 may be physically distributed as one or more encryption servers. In this embodiment, the encryption server 101 encrypts the message using a second set of private and public keys associated with a second server. The message so encrypted is transmitted to the second encryption server. The second server decrypts the message and then encrypts the message using the public key(s) of the recipient(s). When traffic is heavy, the encryption server 101 may optimize its efficiency by determining the computation required to transmit directly to each recipient or transmit the request to one or more distributed servers. This process is transparent to the user.

Figure 3:
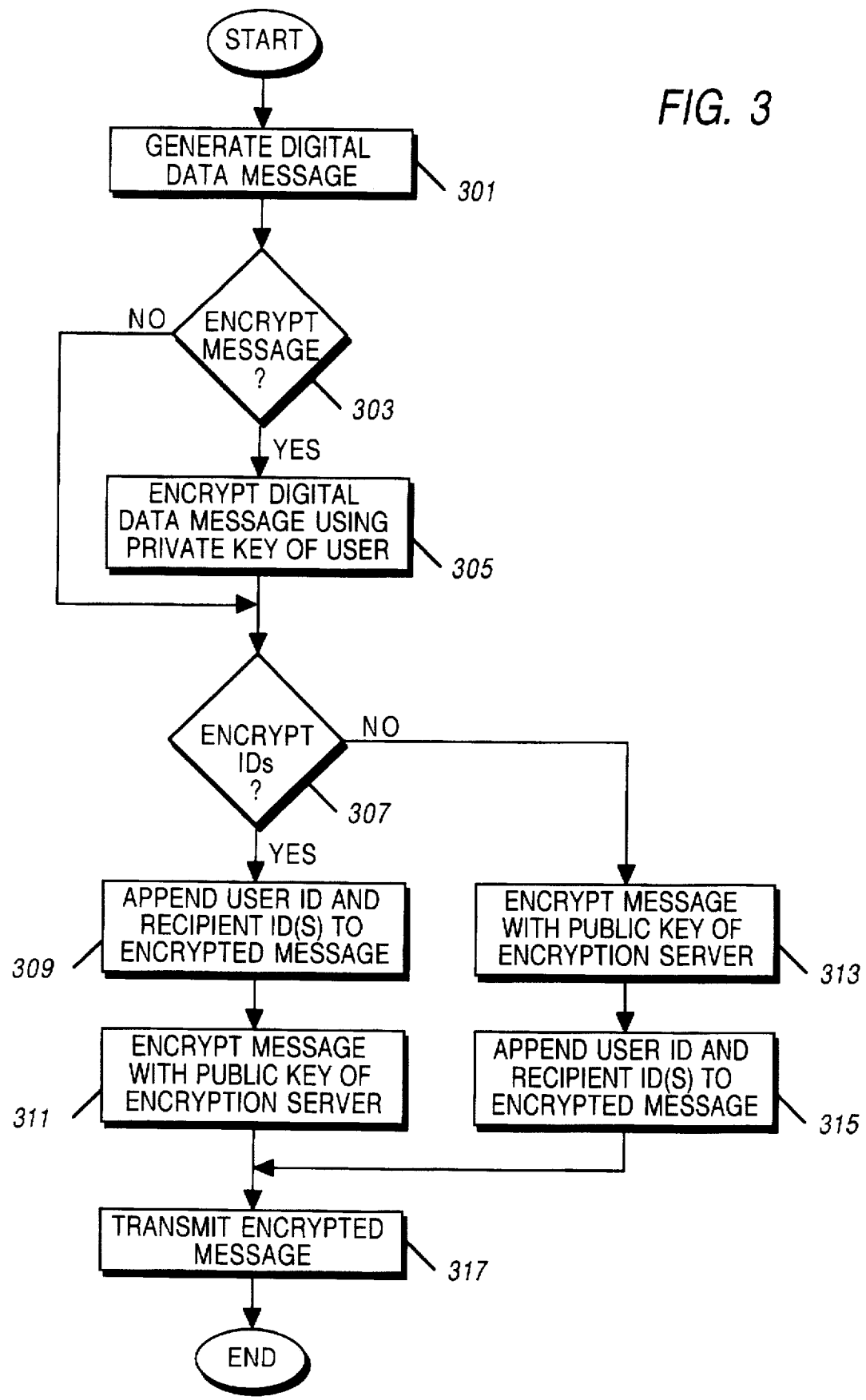
FIG. 3 is a flowchart showing a method of transmission of a digital data message to an encryption server in accordance with the invention.

The flowchart of FIG. 3 shows a method for use by a communication unit in transmitting a digital data message to an encryption server 101. At step 301, a digital data message is generated. If at step 303 the digital data message is not to be encrypted, the process continues with step 307. If at step 303 the digital data message is to be encrypted, the process continues with step 305, where the digital data message is encrypted using the private-key of the user who wishes to communicate the message. At step 307, it is determined if the IDs of the user and/or recipient(s) are to be encrypted. If the IDs are to be encrypted, the process continues with step 309, where the user ID and recipient ID(s) are appended to the encrypted message from step 305 or the unencrypted message from step 301 if no encryption took place. At step 311, the message from step 309, including the appended IDs, is encrypted using the public key of the encryption server 101. The process continues with step 317, where the encrypted message is transmitted to the encryption server 101. If at step 307 the IDs are not to be encrypted, the process continues with step 313, where the encrypted message of step 305 (or the unencrypted message from step 301 if no encryption took place) is encrypted with the public key of the encryption server 101. At step 315, the user ID and recipient ID(s) are appended to the encrypted message of step 313, and the process continues with step 317.

In an alternative embodiment, i.e., when the digital data message is not to be encrypted at step 303 of FIG. 3, the sender or user may decrypt the digital data message and, if desired, the recipient IDs only once, using the encryption server's public key. The encryption server then decrypts the message using the encryption server's private key, and encrypts the message individually for each of the recipients with the recipient's public key. The recipient then decrypts the message using only the recipient's private key. This method requires the user to locally store only one public key, the key of the encryption server. With this method, a single symmetrical key may be used to encrypt and decrypt the messages between the user and the encryption server 101, and one or more keys may be used to encrypt the messages between the encryption server and the recipient. Nevertheless, for better security, the encryption server 101 engaged in this embodiment should be a physically secured, e.g., locked away with limited access, because unencrypted information is present inside the encryption server 101. An advantage of such a system includes enabling law enforcement officials the ability to read the decrypted message as available in the encryption server 101.

Figure 4:
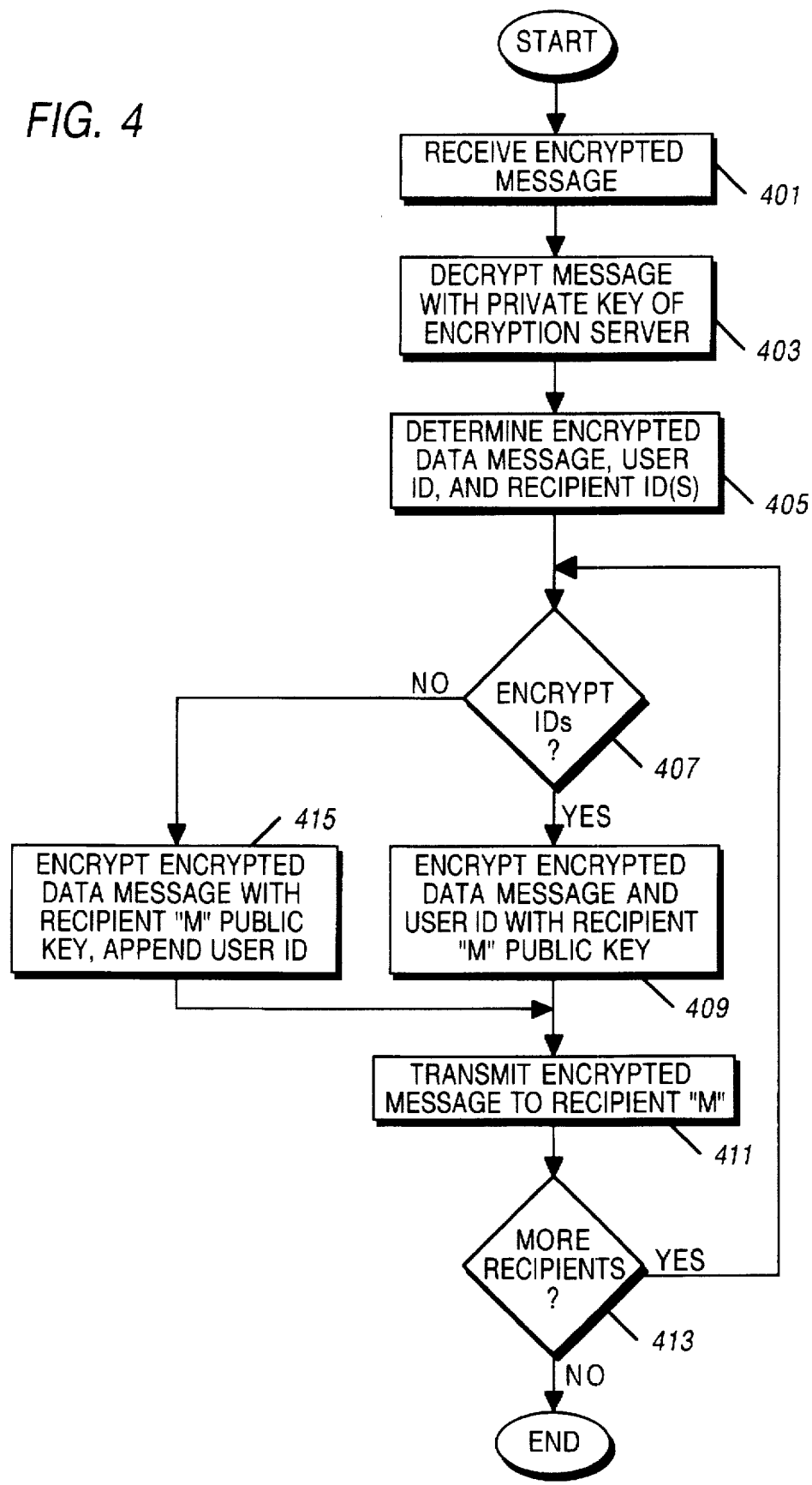
FIG. 4 is a flowchart showing a method of transmission of an encrypted message by an encryption server in accordance with the invention.

The flowchart of FIG. 4 shows the method performed by the encryption server 101 in accordance with the present invention. At step 401, the encryption server receives the encrypted message transmitted by the communication unit 103. At step 403, the encryption server decrypts the message received at step 401 with the private key of the encryption server 101. At step 405, the encryption server determines the user ID, the recipient ID(s), and the encrypted (generated at step 305 of FIG. 3) or unencrypted (generated at step 301 of FIG. 3) data message. In an alternate embodiment, the encryption server 101 may be equipped with the appropriate keys to decrypt the digital data message 105A (when the message 105A is encrypted) so that law enforcement agencies may have full access to all information transmitted in the system.

At step 407, it is determined if the IDs (i.e., the user ID and/or recipient ID(s)) are to be encrypted before transmission. If the IDs are to be encrypted, the process continues with step 409, where the encryption server encrypts the encrypted data message along with the user ID, and the recipient's ID if desired, with the recipient's public key. At step 411, the encryption server transmits the encrypted message to the recipient whose public key was used at step 409. If at step 413 there are more recipients identified by the user to which the encryption server has not yet encrypted and transmitted the message, the process continues with step 407. If there are no more recipients at step 413, the process ends. If at step 407, the IDs are not to be encrypted, the process continues with step 415, where the encrypted data message is encrypted with the recipient's public key, and the user ID and the recipient's ID are appended to that encrypted message without further encryption, and the process continues with step 411.

Optionally, all messages may be encrypted at one time, and then transmitted in succession at one time, rather than encrypting a first message with one public key, then transmitting the encrypted first message right away, then encrypting a second message using another public key, and transmitting the encrypted second message immediately, and so forth.

The above text and associated drawings describe a method using public-key encryption. Private-key encryption, where the same key is used to encrypt and decrypt a message, may also be used. For example, the key used to encrypt the message send to the encryption server may be the same or identical key used to decrypt the encrypted message at the encryption server. In addition, the encryption method employed by the user to encrypt the original digital data message 105A may also be private-key encryption, rather than public-key encryption. In addition, a different encryption algorithm may be utilized for the user's first stage of encryption than for the user's second stage of encryption, the result of which is transmitted to the encryption server.

In the above manner, the encryption server encrypts the user's data message individually for each different recipient using that particular recipient's public key. The encryption server has more computing resources available to it than an individual communication unit, and can encrypt and transmit a message multiple times to many different users in a more efficient manner than can an individual communication unit. Individual communication units need not store all possible recipient's public keys, but instead need store only the encryption server's public key. Encryption of the recipient's ID(s) helps to secure the identity of the recipient(s) and eliminates a source of information for traffic analysis by undesired readers/interceptors of such information.

What is claimed is:

1. A method comprising the steps of:
   at a communication unit operated by a user:
   generating a digital data message;
   encrypting the digital data message using a first key, yielding a first encrypted message;

appending an identification of the user and an identification of a first recipient to the first encrypted message, yielding an appended first encrypted message;

encrypting the appended first encrypted message using a second key, yielding a second encrypted message;

transmitting the second encrypted message to an encryption server;

at the encryption server:

receiving the second encrypted message;

decrypting the second encrypted message using a third key, yielding the appended first encrypted message;

determining the first encrypted message, the identification of the user, and the identification of the first recipient from the appended first encrypted message;

encrypting the first encrypted message and the identification of the user with a fourth key, yielding a third encrypted message;

transmitting the third encrypted message to the first recipient.

2. The method of claim 1, wherein the step of appending further comprises the step of appending an identification of a second recipient to the first encrypted message, thereby yielding the appended first encrypted message.

3. The method of claim 2, further comprising the steps of encrypting, by the encryption server, the first encrypted message and the identification of the user with a fifth key, yielding a fourth encrypted message, and transmitting the fourth encrypted message to the second recipient.

4. The method of claim 3, wherein the fifth key is a public key associated with the second recipient.

5. The method of claim 1, wherein the first key is a private key associated with the user.

6. The method of claim 1, wherein the second key is a public key associated with the encryption server.

7. The method of claim 1, wherein the third key is a private key associated with the encryption server.

8. The method of claim 1, wherein the fourth key is a public key associated with the first recipient.

9. The method of claim 1, wherein the second key and the third key are identical.

10. The method of claim 1, wherein the step of appending further comprises the step of appending three or more identifications of recipients to the first encrypted message, thereby yielding the appended first encrypted message.

11. The method of claim 1, wherein the steps of transmitting are performed over radio frequency communication resources.

12. A method comprising the steps of:

at a communication unit operated by a user:

generating a digital data message;

encrypting the digital data message using a first key, yielding a first encrypted message;

appending an identification of the user and an identification of a first recipient to the first encrypted message, yielding an appended first encrypted message;

encrypting the appended first encrypted message using a second key, yielding a second encrypted message;

transmitting the second encrypted message to the encryption server, wherein the encryption server is not the first recipient.

13. The method of claim 12, wherein the first key is a private key associated with the user.

14. The method of claim 13, wherein the second key is a public key associated with the encryption server.

15. The method of claim 12, wherein the step of appending further comprises the step of appending an identification of a second recipient to the first encrypted message, thereby yielding the appended first encrypted message.

16. A method comprising the steps of:

at an encryption server:

receiving a first encrypted message;

decrypting the encrypted message using a first key, yielding a decrypted message comprising a second encrypted message, an identification of a sender of the first encrypted message, and an identification of a first recipient;

determining the second encrypted message, the identification of the sender, and the identification of the first recipient from the decrypted message;

encrypting the second encrypted message and the identification of the sender with a second key, yielding a third encrypted message;

transmitting the third encrypted message to the first recipient.

17. The method of claim 16, wherein the first key is a private key associated with the encryption server.

18. The method of claim 16, wherein the second key is a public key associated with the first recipient.

19. The method of claim 16, further comprising, when a second identification of a second recipient is part of the decrypted message, the steps of encrypting, by the encryption server, the second encrypted message and the identification of the sender with a third key, yielding a fourth encrypted message, and transmitting the fourth encrypted message to the second recipient.

20. The method of claim 19, wherein the third key is a public key associated with the second recipient.

21. A method comprising the steps of:

at a communication unit operated by a user:

generating a digital data message;

encrypting the digital data message using a private key associated with the user, yielding a first encrypted message;

appending an identification of the user, a first identification of a first recipient, and a second identification of a second recipient to the first encrypted message, yielding an appended first encrypted message;

encrypting the appended first encrypted message using a public key associated with an encryption server, yielding a second encrypted message;

transmitting the second encrypted message to the encryption server;

at an encryption server:

receiving the second encrypted message;

decrypting the second encrypted message using a private key associated with the encryption server, yielding the appended first encrypted message;

determining the first encrypted message, the identification of the user, the identification of the first recipient, and the second identification of the second recipient from the appended first encrypted message;

encrypting the first encrypted message and the identification of the user with a first public key associated with the first recipient, yielding a third encrypted message;

transmitting the third encrypted message to the first recipient;

encrypting the first encrypted message and the identification of the user with a second public key associated with the second recipient, yielding a fourth encrypted message;

transmitting the fourth encrypted message to the second recipient.

22. A method comprising the steps of:

at a communication unit operated by a user:
generating a digital data message;
encrypting the digital data message using a first key, yielding a first encrypted message;
encrypting the first encrypted message using a second key, yielding a second encrypted message;
appending an identification of the user and an identification of a first recipient to the second encrypted message, yielding an appended second encrypted message;
transmitting the appended second encrypted message to the encryption server;

at the encryption server:
receiving the appended second encrypted message;
determining the second encrypted message, the identification of the user, and the identification of the first recipient from the appended second encrypted message;
decrypting the second encrypted message using a third key, yielding the first encrypted message;
encrypting the first encrypted message with a fourth key, yielding a third encrypted message;
transmitting the third encrypted message to the first recipient.

23. The method of claim 22, wherein the step of appending further comprises the step of appending an identification of a second recipient to the second encrypted message, thereby yielding the appended second encrypted message.

24. The method of claim 23, further comprising the steps of encrypting, by the encryption server, the first encrypted message and the identification of the user with a fifth key, yielding a fourth encrypted message, and transmitting the fourth encrypted message to the second recipient.

25. The method of claim 24, wherein the fifth key is a public key associated with the second recipient.

26. The method of claim 24, wherein the identification of the user is appended to the fourth encrypted message before transmitting takes place at the encryption server.

27. The method of claim 22, wherein the first key is a private key associated with the user.

28. The method of claim 22, wherein the second key is a public key associated with the encryption server.

29. The method of claim 22, wherein the third key is a private key associated with the encryption server.

30. The method of claim 22, wherein the fourth key is a public key associated with the first recipient.

31. The method of claim 22, wherein the identification of the user is encrypted using the second key before the step of appending.

32. The method of claim 22, wherein the identification of the user is appended to the first encrypted message before encrypting takes place at the encryption server.

33. The method of claim 22, wherein the step of appending further comprises the step of appending three or more identifications of recipients to the second encrypted message, thereby yielding the appended first encrypted message.

34. The method of claim 22, wherein the steps of transmitting are performed over radio frequency communication resources.

* * * * *